United States Patent [19]
Neuman

[11] Patent Number: 5,880,410
[45] Date of Patent: Mar. 9, 1999

[54] LOAD CELLS WITH INTEGRAL DAMPING

[75] Inventor: Eli Neuman, Magdiel, Israel

[73] Assignee: Tedea Huntleigh International, Ltd., Herzliya, Israel

[21] Appl. No.: 378,601

[22] Filed: Jan. 26, 1995

[51] Int. Cl.⁶ .............................. G01G 21/10; G01G 3/08
[52] U.S. Cl. ............................................. 177/187; 177/229
[58] Field of Search ..................................... 177/184, 185, 177/186, 187, 188, 189, 229

[56] References Cited

U.S. PATENT DOCUMENTS

| | | | |
|---|---|---|---|
| 3,842,924 | 10/1974 | Schmitter et al. | 177/184 |
| 3,982,738 | 9/1976 | Meier et al. | 177/184 X |
| 3,985,190 | 10/1976 | Kammerer et al. | 177/184 |
| 4,440,250 | 4/1984 | Sigg | 177/187 |
| 4,441,569 | 4/1984 | Sashiki et al. | 177/211 |
| 4,593,778 | 6/1986 | Konishi et al. | 177/185 |
| 4,616,511 | 10/1986 | Gindy et al. | 177/211 X |
| 4,799,561 | 1/1989 | Komoto | 177/229 |
| 4,848,495 | 7/1989 | Hayashi | 177/187 |
| 5,141,064 | 8/1992 | Willemsen et al. | 177/184 |
| 5,232,062 | 8/1993 | Neuman | 177/187 |

*Primary Examiner*—Hezron E. Williams
*Assistant Examiner*—Randy W. Gibson
*Attorney, Agent, or Firm*—Thomas I. Rozsa; Tony D. Chen; Jerry Fong

[57] ABSTRACT

A load cell for weighing purposes which incorporates viscous damping inside a chamber in the body of the load cell. Specifically, symmetrical load cells have a central member which is where the load or weight is applied. This member is deflected under load as is common to all load cells, creating a distance change between said member and the static or fixed part of the load cell and in which the fixed part is used for mounting on a base holding the load cell. A round cavity or a cylinder space built into the static part accepts a piston which in turn is rigidly connected to the deflected part. Thus, upon loading, the piston has a slight movement relative to the cylinder. If a viscous fluid is then placed in the cavity such that the piston is immersed in it, a viscous damping will be achieved; its intensity depending on the fluid's viscosity, the geometry of the piston and cylinder, and on the load cell characteristics.

53 Claims, 4 Drawing Sheets

LOAD CELLS WITH INTEGRAL DAMPING

BACKGROUND OF THE INVENTION

1. Field of the Invention

The present invention relates to the field of load cells, which are transducers for measuring forces or weights, and in particular, to applications where viscous damping of the load cell is called for because fast settling time or filtering out vibrations is necessary.

2. Description of The Prior Art

Load cells have been used with viscous damping devices and are generally of three types: (1) Standard dashpot arrangements in which a piston moves within a cylinder where the piston generally fits the inside of the cylinder with a very small radial gap. In this way, the small radial gap prevents any leakage flow between the piston and cylinder while the piston also contains a controlled narrow passage through which fluid flows from one side of the piston when the latter moves and in which the passage flow provides the viscous damping; (2) Another method is the one disclosed by U.S. Pat. No. 5,232,062 and according to which the gap between a piston and a cylinder is of no importance and hence can be quite wide; (3) The third method uses the shear of the fluid between two parallel and close plates moving in parallel to one another.

In all of the known prior art, the damping device is external to the load cell and is added to a conventional load cell. It is therefore the object of the present invention to disclose an integral arrangement of a damping device inside the body of the load cell, thus forming a dedicated damped load cell.

SUMMARY OF THE INVENTION

The present invention is a load cell for weighing purposes which incorporates viscous damping inside a chamber in the body of the load cell. Specifically, symmetrical load cells have a central member which is where the load or weight is applied. This member is deflected under load as is common to all load cells, creating a distance change between said member and the static or fixed part of the load cell and in which the fixed part is used for mounting on a base holding the load cell. A round cavity or a cylinder space built into the static part accepts a piston which in turn is rigidly connected to the deflected part. Thus, upon loading, the piston has a slight movement relative to the cylinder. If a viscous fluid is then placed in the cavity such that the piston is immersed in it, a viscous damping will be achieved; its intensity depending on the fluid's viscosity, the geometry of the piston and cylinder, and on the load cell characteristics. It is the object of the present invention to disclose such integral damping device with the detailed design of a piston and cylinder following any one of the three general damping approaches as discussed above.

It has been discovered, according to the present invention, that if an integrated damping device is incorporated within a load cell, it will provide means for creating resistance to movement, which constitutes the viscous damping.

It is therefore the object of the present invention to provide a load cell which has an integral arrangement of a damping device inside the body of the load cell, thereby forming a dedicated damped load cell for creating resistance to movement, which constitutes the viscous damping.

It is a further object of the present invention to provide an asymmetrical load cell which has an integral damping device, thereby forming an asymmetrical dedicated damping load cell for creating resistance to movement, which constitutes the viscous damping.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
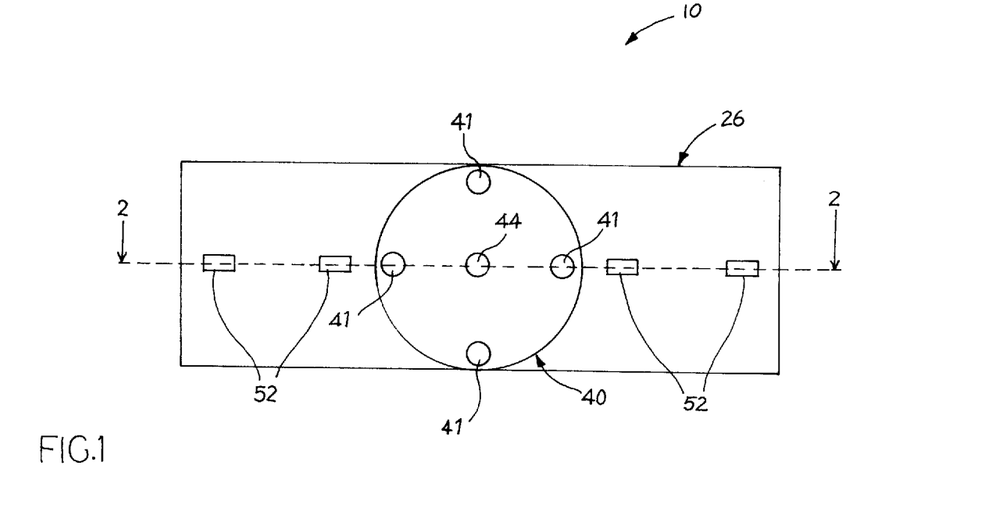
FIG. 1 is a top plan view of the preferred embodiment of the present invention load cell.
Figure 2:
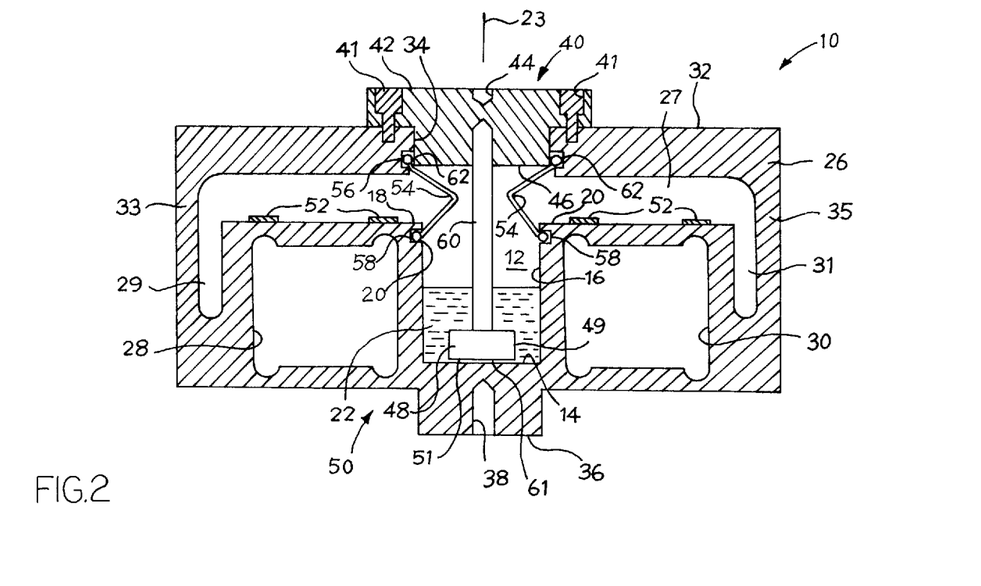
FIG. 2 is a cross-sectional view taken along line 2—2 of FIG. 1, showing two off-center load cells with an integral damping means.

Referring to FIGS. 1 and 2, there is illustrated at 10 the preferred embodiment of the present invention unitary load cell with a built-in integral damping means. The load cell 10 comprises a generally rectangular shaped body 26. The term "off-center load cell" means a load cell which can accurately measure weight regardless of the location of the weight. The rectangular shaped body 26 comprises a pair of opposing off-center load cells 28 and 30 integrally connected to each other and forming a unitary one piece weighing unit and an integral damping apparatus 50. The rectangular shaped body 26 has a top end 32 with a central opening 34, an inner hollow cylindrical shaped chamber 12, and a bottom mounting end 36 with one or more connecting means 38. The weighing device 10 further comprises a horizontal interior opening 27 which permits the load cells 28 and 30 to deflect downward when a downward force 23 is applied to the weighing device 10. Each respective end of the interior opening 27 comprises a vertical opening 29 and 31 respectively which enable vertical walls 33 and 35 to be more compliant so they can conform to the geometry of the deflected load cells 28 and 30 when a force is applied so that the accuracy of the weighing device 10 is retained.

In weighing devices such as the one described herein, the weight is ultimately determined by at least two strain gages 52 which create a voltage corresponding to the weight of the object. Although any suitable weighing device can be used, load cells typically contain strain gages 52 in the form of fine wires arranged in a pattern and cemented to a location on the load cell that will be subjected to physical strain. The fine wires will have a certain resistance when the metal to which they are cemented is not under strain. When the metal is distorted, the attached wires, due to their elastic properties, will be stretched. This in turn reduces the wire cross section and increases its length so that the resistance within the wires is changed. The differences in resistance are converted to changes in voltage through the use of a basic bridge circuit. This configuration is commonly used in today's high accuracy load cells, although other configurations may be utilized with the load cells.

The inner chamber 12 is located between the pair of opposing off-center load cells 28 and 30. The inner chamber 12 is defined by a substantially flat bottom wall 14 and a circumferential sidewall 16. The sidewall 16 is integrally connected to the flat bottom wall 14 and extends upwardly from the flat bottom wall 14 and forms an upper portion 18. A circular recess 20 is located in the interior of the upper portion 18 of the inner chamber 12.

A load receiving adaptor 40 is mounted on the top end 32 of the rectangular shaped body 26 of the weighing device 10 by connecting means 41. The load receiving adaptor 40 has a top end 42 with connecting means 44 and a protruding bottom end 46 which extends through and covers the central opening 34 at the top end 32 of the rectangular shaped body 26.

A damping piston means 48 has generally a disc shaped body, a circumferential side surface 49 and a substantially flat lower surface 51. The circumferential dimension of the damping piston 48 is smaller than the circumferential dimension of the inner chamber 12 so that damping piston 48 will not touch the sidewall 16. The damping piston 48 is horizontally disposed and slidably supported within the inner chamber 12 by a vertical connecting means or rod means 60, and securely connected to the protruding bottom end 46 of the load receiving adaptor 40. The damping piston 48 is submerged in a body of viscous fluid 22 contained in the inner chamber 12, and positioned very close to the bottom wall 14 of the chamber 12, which leaves an area 61 between the damping piston 48 and the bottom wall 14 of the inner chamber 12. When a load or force 23 is applied on the load receiving adaptor 40, the damping piston 48 will move downwardly toward the bottom wall 14 of the chamber 12, which will force the viscous fluid 22 to flow away from the area 61 between the damping piston 48 and the bottom wall 14 of the chamber 12. Since the viscous fluid 22 has to be pushed away through the space 61, it creates a significant resistance to the movement of the damping piston 48, which constitutes the viscous damping.

A seal means, which by way of illustration only can be a circular bellows seal means 54, has an upper end 56 and a lower end 58. The upper end 56 of the bellows seal 54 is placed around the protruding bottom end 46 of the load receiving adaptor 40 and covers the central opening 34 at the top end 32 of the rectangular shaped body 26 for sealing the body of viscous fluid 22 within the chamber 12. The bellows seal 54 is held in position by placing the upper end 56 within a recess 62 located on the side of the central opening 34 of the rectangular shaped body 26. The lower end 58 is placed within the circular groove 20 at the upper portion 18 of the chamber 12.

The operation of the foregoing embodiment now will be described. When load 23 is applied on the load receiving adaptor 40, the entire load cell 10 is deflected. During the deflections, the damping piston 48 is moved toward the bottom wall 14 of the chamber 12. The viscous fluid 22 in the gap 61 between the damping piston 48 and wall bottom 14 has to flow out of the gap 61, thus creating strong resistance and hence viscous damping of the deflection.

The present invention weighing device can be made from several materials. By way of example, the weighing device can be made of stainless steel or aluminum. The present invention conforms to conventional forms of manufacture or any other conventional way known to one skilled in the art. The present invention is easy to use so it provides a device that will be economically feasible, long lasting and relatively trouble-free in operation.

Figure 3:
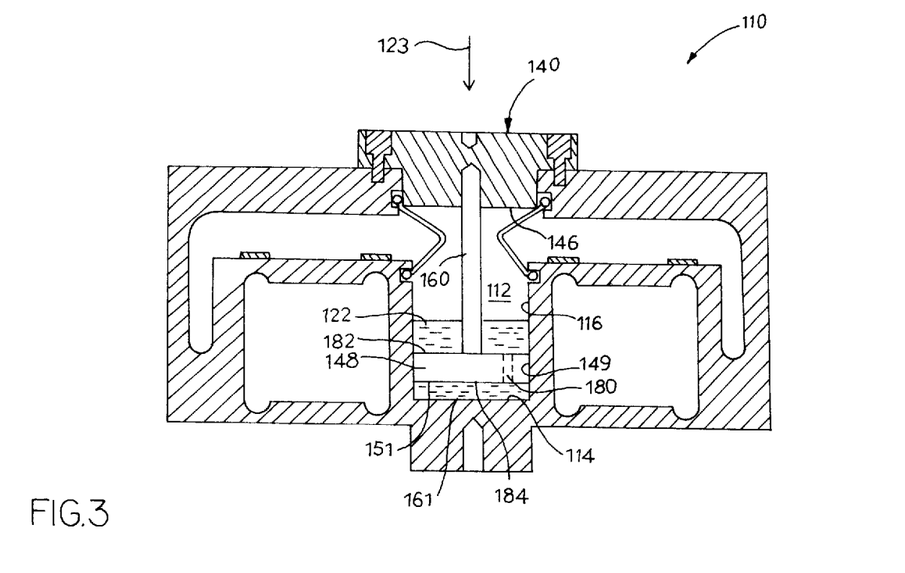
FIG. 3 is a cross-sectional view of a second embodiment of the present invention off-center load cells with an integral damping means.

The second embodiment of the present invention is very similar to the first embodiment just discussed and the only difference is the nature and configuration of the damping piston 148 relative to bottom wall 114 and sidewall 116 of the chamber 112. All of the parts of the second embodiment load cell 110 are numbered correspondingly with 100 added to each number.

Referring to FIG. 3, the damping piston means 148 has a generally disc shaped body, a circumferential side surface 149 and a substantially flat lower surface 151. The circumferential dimension of the damping piston 148 is almost as large as the interior circumferential of chamber 112, thereby leaving only a very narrow gap between sidewall 116 and side surface 149 of the damping piston 148. The damping piston 148 is horizontally disposed and slidably supported within the inner chamber 112 by a vertical connecting rod means 160, and securely connected to the protruding bottom end 146 of the load receiving adaptor 140. The damping piston 148 is submerged in a body of viscous fluid 122 contained in the inner chamber 112, and positioned away from the bottom wall 114 of the chamber 112, which leaves a large area 161 between the damping piston 148 and the bottom wall 114 of the inner chamber 112. In this alternative embodiment, the damping piston 148 further comprises a vertical interior narrow passage 180 (shown in dashed lines) interconnecting top 182 and bottom 184 of the damping piston 148 such that viscous fluid 122 can flow through the narrow passage 180. When a load 123 is applied on the load receiving adaptor 140, the damping piston 148 will move downwardly toward the bottom wall 114 of the chamber 112, which will force the viscous fluid 122 to flow through the narrow passage 180, thereby creating significant resistance to the movement of the damping piston 148, which constitutes the viscous damping.

Figure 4:
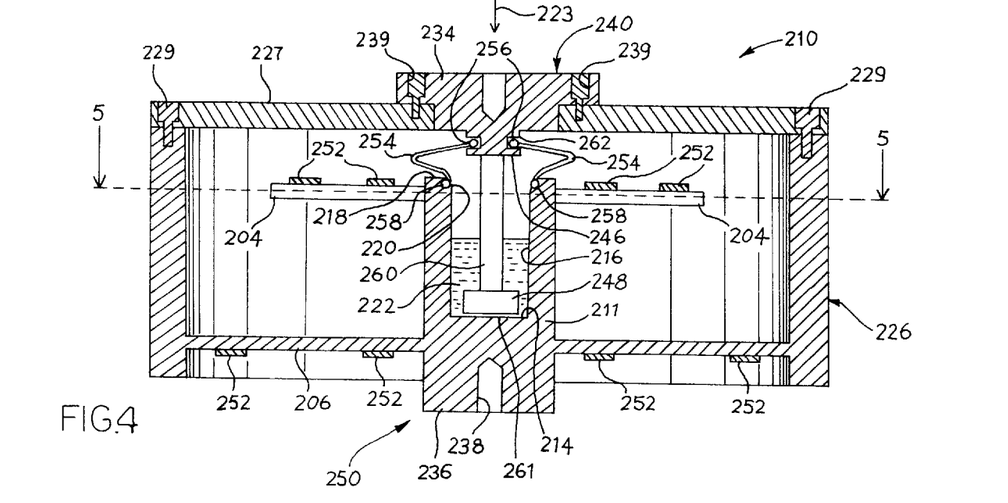
FIG. 4 is a cross-sectional view of a third embodiment of the present invention load cell with an integral damping means, taken along line 4—4 of FIG. 5.
Figure 5:
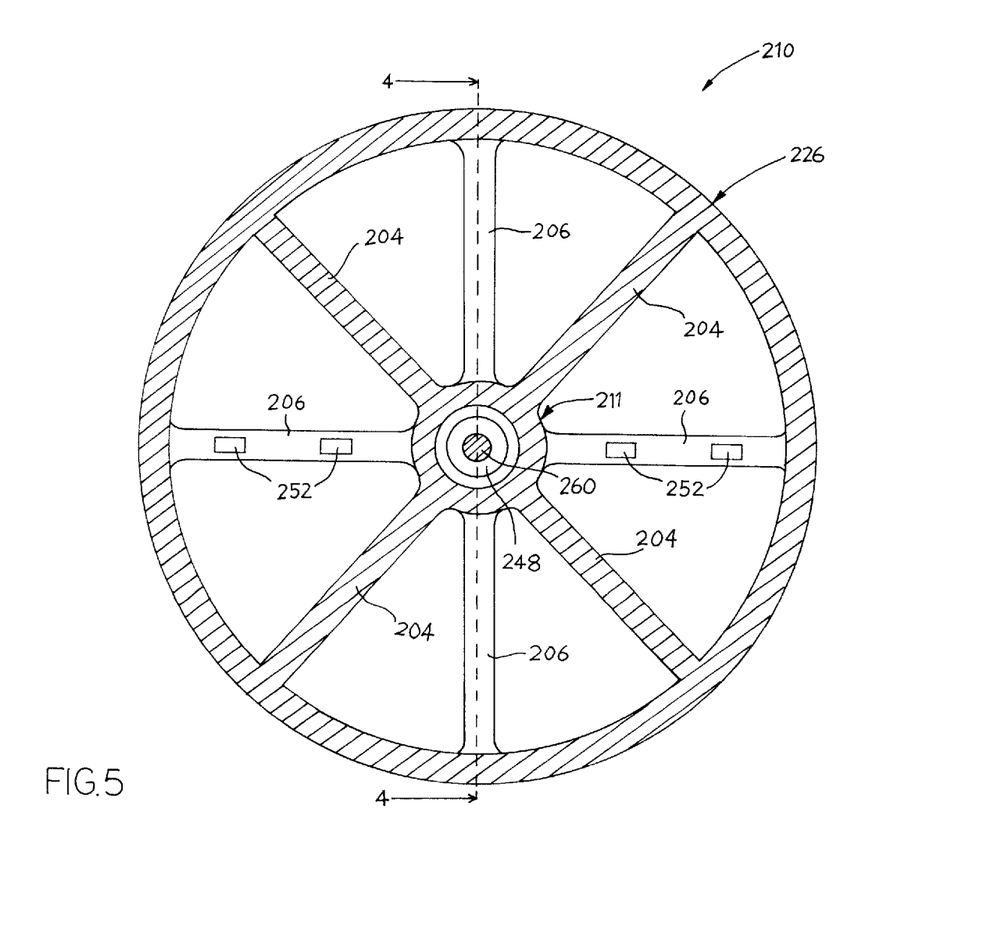
FIG. 5 is a top cross-sectional view taken along line 5—5 of FIG. 4.

Referring to FIGS. 4 and 5, there is illustrated at 210 the third embodiment of the present invention unitary load cell with a built-in integral damping means 250. The load cell 210 is a generally cylindrical shaped body 226. The load cell 210 has a central vertical column 211, two or more top horizontal beams 204 and two or more bottom horizontal beams 206. All of the beams 204 and 206 are integrally connected (as one piece) to the central vertical column 211 and extend in radial lines therefrom and connect to the cylindrical shaped body 226. The beams in each level are evenly spaced around the vertical column 211. The top horizontal beams 204 are respectively oriented approximately 45° to the bottom horizontal beams 206. The load cell 210 is connected to a base through connecting means 238 located at the protruding bottom end 236 of the central vertical column 211. The central vertical column 211 is the fixed part of the load cell 210. The upper part of the load cell 210 further comprises a disk shaped cover member 227 with a central opening 234. The periphery of the disk shaped cover member 227 is connected to the upper surface of cylindrical shaped body 226 by connecting means 229. At the central opening 234 of the upper disk shaped cover member 227, there is a load accepting member 240 which is in turn connected to the upper disk shaped cover member 227 by connecting means 239. The weight of the force is placed on the load accepting member 240.

When a load or force 223 is placed on the load accepting member 240, the force is transferred to the cylindrical shaped body 226 through the upper disk shaped cover member 227, thus pushing the cylindrical shaped body centrally downward and causing all of the horizontal beams, both the top and bottom beams 204 and 206 respectively to deflect, while the central vertical column 211 which is supported on the base remains static. Strain gages 252 are bonded on one or more of the horizontal surfaces of the top and bottom beams 204 and 206, and when the beams are deflected, the strain gages 252 will produce a voltage output proportional to the weight of the load.

The central vertical column 211 has built into it a damping means 250 comprised of a cylindrical interior chamber 212 with internal sidewall 216 and a flat bottom wall 214. The load accepting member 240 in turn supports a connecting rod 260 which is attached to the load accepting member 240 at the top end of the connecting rod 260. The bottom end of the connecting rod 260 is attached to a horizontal damping piston 248 having a generally cylindrical shaped body. The diameter of the damping piston 248 is slightly smaller than the diameter of the interior chamber 212 such that the circumferential wall of the damping piston 248 will not touch the interior sidewall 216 of the cylindrical interior chamber 212. The axis of the cylindrical shaped connecting rod 260 of the damping piston 248 will be on the same line, with the damping piston 248 extending into the cylindrical interior chamber 212. The damping piston 248 is horizontally disposed and slidably supported within the interior chamber 212 by the vertical connecting means or rod 260, which in turn is securely connected to the protruding bottom end 246 of the load accepting member 240. The damping piston 248 is submerged in a body of viscous fluid 222 contained in the interior chamber 212, and positioned very close to the bottom wall 214 of the chamber 212, which leaves an area 261 between the damping piston 248 and the bottom wall 214 of the interior chamber 212. When a load or force 223 is applied on the load accepting member 240, the damping piston 248 will move downwardly toward the bottom wall 214 of the chamber 212, which will force the viscous fluid 222 to flow away from the area 261 between the damping piston 248 and the bottom wall 214 of the chamber 212. Since the viscous fluid 222 has to be pushed away through the space 261, it creates a resistance to movement of the damping piston 248, which constitutes the viscous damping.

A seal means, which by way of illustration only can be a circular bellows seal means 254, has an upper end 256 and a lower end 258. The upper end 256 of the bellows seal 254 is placed around the protruding bottom end 246 of the load accepting member 240 and covers the central opening 234 at the top of the rectangular shaped body 226 for sealing the body of viscous fluid 222 within the interior chamber 212. The bellows seal 254 is held in position by placing the upper end 256 within a recess 262 located on the exterior side of the protruding bottom end 246 of the load accepting member 240. The lower end 258 is placed within the circular groove 220 at the upper portion 218 of the chamber 212.

The operation of the foregoing embodiment now will be described. When the load 223 is applied on the load accepting member 240, the entire load cell 210 is deflected. During the deflections, the damping piston 248 is moved toward the bottom wall 214 of the chamber 212. The viscous fluid 222 in the gap 261 between the damping piston 248 and wall bottom 214 has to flow out of the gap 261, thereby creating resistance and hence Viscous damping of the deflection.

Figure 6:
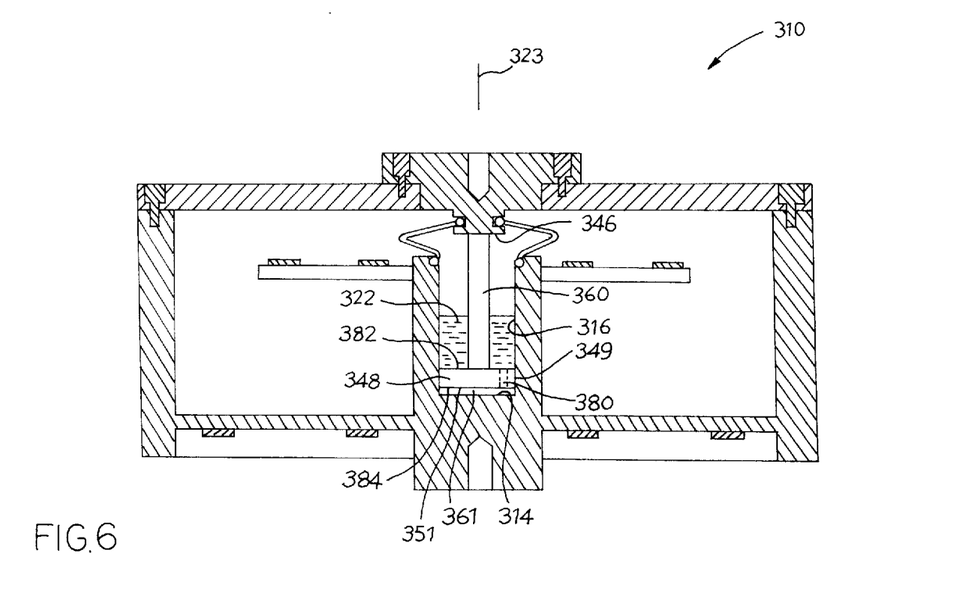
FIG. 6 is a cross-sectional view of a fourth embodiment of the present invention load cell with an integral damping means.

The fourth embodiment of the present invention is very similar to the third embodiment just discussed and the only difference is the nature and configuration of the damping piston 348 relative to flat bottom wall 314 and circumferential sidewall 316 of the chamber 312. All of the parts of the fourth embodiment load cell 310 are numbered correspondingly with 300 added to each number.

Referring to FIG. 6, the damping piston means 348 has a generally disc shaped body, a circumferential side surface 349 and a substantially flat lower surface 351. The circumferential dimension of the damping piston 348 is almost as large as the interior circumferential of chamber 312, thereby leaving only a very narrow gap between sidewall 316 of the interior chamber 312 and side surface 349 of the piston 348. The damping piston 348 is horizontally disposed and slidably supported within the inner chamber 312 by a vertical connecting rod means 360, and securely connected to the protruding bottom end 346 of the load accepting member 340. The damping piston 348 is submerged in a body of viscous fluid 322 contained in the interior chamber 312, and positioned away from the bottom wall 314 of the chamber 312, which leaves a large area 361 between the damping piston 348 and the bottom wall 314 of the interior chamber 312. In this embodiment, the damping piston 348 further comprises a vertical interior narrow passage 380 (shown in dashed lines) interconnecting top 382 and bottom 384 of the damping piston 348 such that viscous fluid 322 can flow through the narrow passage 380. When a sudden load 323 is applied on the load accepting member 340, the damping piston 348 will move downwardly toward the bottom wall 314 of the chamber 312, which will force the viscous fluid 322 to flow through the narrow passage 380, thereby creating significant resistance to the movement of the damping piston 348, which constitutes the viscous damping.

Figure 7:
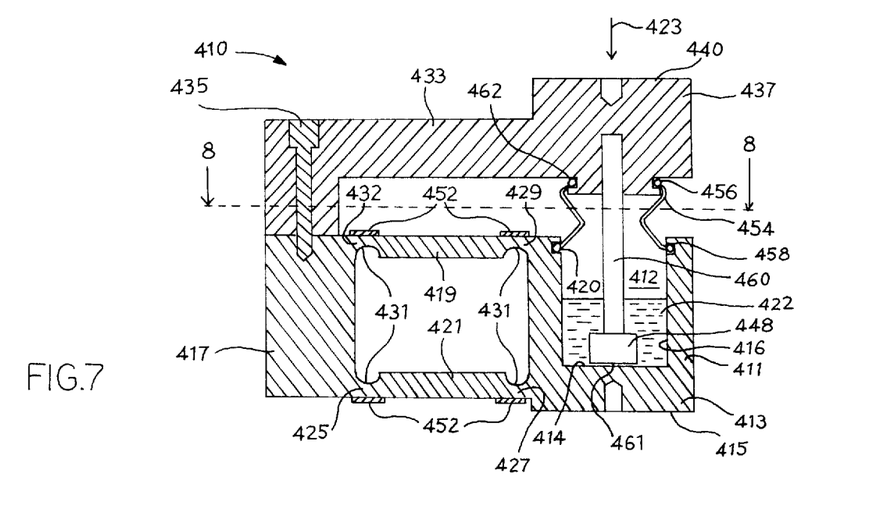
FIG. 7 is a cross-sectional view of a fifth embodiment of the present invention load cell with an integral damping means.
Figures 8, 9:
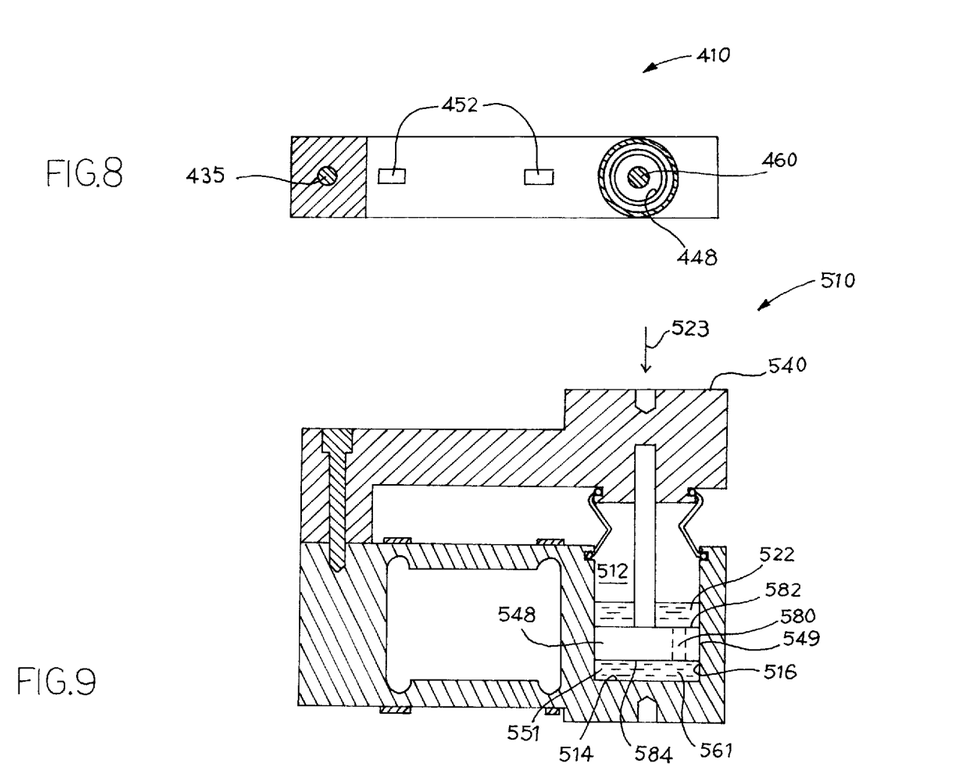
FIG. 8 is a top cross-sectional view taken along line 8—8 of FIG. 7.
FIG. 9 is a cross-sectional view of a sixth embodiment of the present invention load cell with an integral damping means.

Referring to FIGS. 7 and 8, there is illustrated a fifth embodiment of the off center load cell 410 which comprises a first side 411 having a lower portion 413 which functions as a mounting surface 415 to connect the off center load cell 410 to a base. The first side 411 is the load cell's fixed side. This first side 411 is connected to the opposite second side or deflectable part 417 by two or more deflectable beams 419 and 421 or stress surfaces. At locations of the connecting points 425, 427, 429, and 432 between the two beams of the first and second sides 411 and 417, there is located reduced cross-sectional areas 431 in the beam to define deflections points. At least two strain gages 452 are bonded on one or more horizontal surfaces of the upper and lower beams 419 and 421 at the location of the reduced cross-section.

An upper horizontal member or extension part 433 is connected to the top surface of the second side 417 by connecting means 435. At the opposite side or first side 437 of the upper horizontal member 433, there is a top horizontal surface 440 which functions as the load accepting means. At the bottom of this first side 437 of the upper horizontal member 433 a vertically oriented connecting rod 460 is securely fastened at the top end while the rod 460 extends downwardly into a cylindrical interior chamber 412 found in the first side 411 of the load cell 410.

The cylindrical interior chamber 412 has an internal sidewall 416 and a flat bottom wall 414. The first side 437 of the upper horizontal member 433 in turn supports the connecting rod 460 which is attached to the bottom of the first side 437 of the upper horizontal member 433 at the top end of the connecting rod 460. The bottom end of the connecting rod 460 is attached to a horizontal damping piston 448 having a generally cylindrical shaped body. The diameter of the damping piston 448 is slightly smaller than the diameter of the interior chamber 412 such that the circumferential wall of the damping piston 448 will not touch the interior sidewall 416 of the cylindrical interior chamber 412. The axis of the cylindrical shaped connecting rod 460 of the damping piston 448 will be on the same line with the damping piston 448 extending into the cylindrical interior chamber 412. The damping piston 448 is horizontally disposed and slidably supported within the interior chamber 412 by the vertical connecting means or rod 460, which in turn is securely connected to the bottom of the upper horizontal member 433. The damping piston 448 is submerged in a body of viscous fluid 422 contained in the interior chamber 412, and positioned very close to the bottom wall 414 of the chamber 412, which leaves an area 461 between the damping piston 448 and the bottom wall 414 of the interior chamber 412. When a load or force 423 is applied on the load accepting means 440, the damping piston 448 will move downwardly toward the bottom wall 414 of the chamber 412, which will force the viscous fluid 422 to flow away from the area 461 between the damping piston 448 and the bottom wall 414 of the chamber 412. Since the viscous fluid 422 has to be pushed away through the space 461, it creates a resistance to movement of the damping piston 448, which constitutes the viscous damping.

A seal means, which by way of illustration only can be a circular bellows seal means 454, has an upper end 456 and a lower end 458. The upper end 456 of the bellows seal 454 is placed around the bottom of the first side 437 of the upper horizontal member 433 for sealing the body of viscous fluid 422 within the chamber 412. The bellows seal 454 is held in position by placing the upper end 456 within a recess 462 located on the exterior side of the bottom of the first side 437 of the upper horizontal member 433. The lower end 458 is placed within the circular groove 420 at the upper portion 418 of the chamber 412.

The operation of the foregoing embodiment now will be described. When load 423 is applied on the top horizontal surface 440 of the first side 437 of the upper horizontal member 433, the load cell 410 is deflected. During the deflections, the damping piston 448 is moved toward the bottom wall 414 of the chamber 412. The viscous fluid 422 in the gap 461 between the piston 448 and wall bottom 414 has to flow out of the gap 461, thereby creating strong resistance and hence viscous damping of the deflection.

The sixth embodiment of the present invention is very similar to the fifth embodiment just discussed and the only difference is the nature and configuration of the damping piston 548 relative to bottom wall 514 and sidewall 516 of the chamber 512. All of the parts of the fourth embodiment load cell 510 are numbered correspondingly with 500 added to each number.

Referring to FIG. 9, the damping piston means 548 has a generally disc shaped body, a circumferential side surface 549 and a substantially flat lower surface 551. The circumferential dimension of the damping piston 548 is almost as large as the interior circumferential wall of chamber 512, thereby leaving only a very narrow gap between sidewall 516 and side surface 549 of the piston 548. The damping piston 548 is horizontally disposed and slidably supported within the interior chamber 512 by the vertical connecting means or rod 560, which in turn is securely connected to the bottom of the upper horizontal member 533. The damping piston 548 is submerged in a body of viscous fluid 522 contained in the interior chamber 512, and positioned away from the bottom wall 514 of the chamber 512, which leaves a large area 561 between the damping piston 548 and the bottom wall 514 of the inner chamber 512. In this embodiment, the damping piston 548 further comprises a vertical interior narrow passage 580 interconnecting the top 582 and bottom 584 of the damping piston 548 such that viscous fluid 522 can flow through the narrow passage 580. When a load 523 is applied on the load accepting means 540, the damping piston 548 will move downwardly toward the bottom wall 514 of the chamber 512, which will force the viscous fluid 522 to flow through the narrow passage 580 thereby creating resistance to movement of the damping piston 548, which constitutes the viscous damping.

Defined more broadly, the present invention is a load cell device, comprised of at least one off-center load cell having a fixed part which is mounted on a base and a deflectable part which when loaded deflects slightly relative to said fixed part, and said deflectable part having an extension part securely connected and extending generally in the direction of said fixed part such that it ends generally where said fixed part ends such that said extension part opposes said fixed part but does not touch it or any other part of said load cell device except where said deflectable part is connected, and in which arrangement when load is applied on said deflectable part there will result a slight relative motion between said extension part and said fixed part opposing it, and having strain gages bonded on stressed surfaces such that when loaded, a voltage output signal is produced which is proportional to the weight of the load, and into said fixed part a cylindrical space is built, while in the opposing extension part, a piston is securely connected through a connecting rod, which connecting rod causes said piston to move into said cylindrical space such that said piston, connecting rod and said cylindrical space all lie on the same concentric line, said cylindrical space filled with viscous fluid covering at least said piston and said piston having a very small gap between its own lower surface and the bottom of said cylindrical space, such that when a force is applied to said load cell then said piston is caused to move within said cylindrical space toward said bottom of said cylindrical space and viscous damping is created.

Defined in detail, the present invention is a load cell device for determining the weight of an object, comprising: (a) a pair of opposing off-center load cells integrally connected to each other and forming a unitary body, the unitary body having a top end with a central opening, a central cylindrical interior chamber located between the pair of opposing off-center load cells, and a protruding bottom end, the cylindrical interior chamber defined by a flat bottom and a circumferential sidewall with an upper portion; (b) a load receiving adaptor mounted on said top end of said unitary body by connecting means, the load receiving adaptor having a protruding bottom end extending through and covering said central opening of said top end of said unitary body; (c) at least two equally spaced apart strain gages respectively attached to a respective one of said pair of opposing off-center load cells, and lying generally on a horizontal plane for producing a voltage output proportional to the weight of said object; (d) a damping piston means having a circumferential side surface and a substantially flat lower surface; (e) the circumferential wall of said damping piston means being smaller than the circumferential wall of said interior chamber; (f) means for attaching said damping piston means to said protruding bottom end of said load receiving adaptor and suspending said damping piston means in said interior chamber, such that said circumferential side surface of said damping piston means clears said circumferential sidewall of said interior chamber, but said substantially flat lower surface of said damping piston means is positioned parallel and very close to said flat bottom wall of said interior chamber, which leaves a very narrow space between said substantially flat lower surface of said damping piston means and said flat bottom of said interior chamber; (g) a body of viscous fluid of sufficient quantity contained in said interior chamber such that at least said substantially flat lower surface of said damping piston means is submerged; and (h) a bellows seal means mounted between said interior chamber and said load receiving adaptor and having a bottom end and a top end, the bottom end attached to said upper portion of said interior chamber, and the op end attached to a side of said central opening of said top end of said unitary body such that it seals said body of viscous fluid contained in said interior chamber; (i) whereby loading on said load receiving adaptor creates deflection on said pair of off-center load cells, thereby producing said voltage output proportional to the weight of said object, and when a mechanical shock is discharged on said load receiving adaptor and causes the object to vibrate, the vibration will be transferred to said damping piston means and cause said substantially flat lower surface of said damping piston means to move toward said flat bottom of said interior chamber, so that said body of viscous fluid between said substantially flat lower surface of said damping piston means and said flat bottom of said interior chamber is compressed and creates a resistance force on said damping piston means that effectively dampens the vibration.

Defined broadly, the present invention is a load cell device for determining the weight of an object, comprising: (a) at least two load cells integrally connected to each other and forming a unitary body, the unitary body having a first end with an opening, and an interior chamber defined by a flat bottom and a sidewall with an upper portion and located between the at least two off-center load cells; (b) a load receiving means for covering said opening of said first end of said unitary body; (c) at least two equally spaced apart strain gages respectively attached to said unitary body and lying on a horizontal plane for producing a voltage output proportional to the weight of said object; (d) a piston means having a side surface and a flat lower surface, the circumferential dimension of the piston means being smaller than the circumferential dimension of said interior chamber; (e) means for attaching said piston means to said load receiving means and suspending said piston means in said interior chamber, such that said side surface of said piston means clears said sidewall of said interior chamber, but said flat lower surface of said piston means is positioned parallel and very close to said flat bottom of said interior chamber, which leaves a very narrow space between said flat lower surface of said piston means and said flat bottom of said interior chamber; (f) a body of viscous fluid of sufficient quantity contained in said interior chamber such that at least said flat lower surface of said piston means is submerged; and (g) means for sealing said body of viscous fluid contained in said interior chamber; (h) whereby loading on said load receiving means creates deflection on said at least two load cells, thereby producing said voltage output proportional to the weight of said object, and when a mechanical shock is discharged on said load receiving means, the vibration will be transferred to said piston means and cause said flat lower surface of said piston means to move toward said flat bottom of said interior chamber, so that said body of viscous fluid between said flat lower surface of said piston means and said flat bottom of said interior chamber is compressed and creates a resistance force on said piston means that effectively dampens the vibration.

Defined alternatively in detail, the present invention is a load cell device for determining the weight of an object, comprising: (a) a pair of opposing off-center load cells integrally connected to each other and forming a unitary body, the unitary body having a top end with a central opening, a central cylindrical interior chamber located between the pair of opposing off-center load cells, and a protruding bottom end, the cylindrical interior chamber defined by a flat bottom and a circumferential sidewall with an upper portion; (b) a load receiving adaptor mounted on said top end of said rectangular shaped unitary body by connecting means, the load receiving adaptor having a protruding bottom end extending through and covering said central opening of said top end of said rectangular shaped unitary body; (c) at least two equally spaced apart strain gages respectively attached to a respective one of said pair of off-center load cells, and lying generally on a horizontal plane for producing a voltage output proportional to the weight of said object; (d) a damping piston means having a circumferential side surface, a substantially flat lower surface, an upper surface and a vertical interior narrow passage extending through the damping piston means from the upper surface to the flat lower surface; (e) the circumferential wall of said damping piston means being slightly less than the circumferential wall of said interior chamber; (f) means for attaching said damping piston means to said protruding bottom end of said load receiving adaptor and suspending said damping piston means in said interior chamber, such that said circumferential side surface of said damping piston means is very close to said circumferential sidewall of said interior chamber, but said substantially flat lower surface of said damping piston means is positioned parallel and remote from said flat bottom of said interior chamber, which leaves a large space between said substantially flat lower surface of said damping piston means and said flat bottom of said interior chamber; (g) a body of viscous fluid of sufficient quantity contained in said interior chamber such that at least said substantially flat lower surface of said damping piston means is submerged such that the body of viscous fluid can flow through said narrow passage of said damping piston means; (h) a bellows seal means mounted between said interior chamber and said load receiving adaptor and having a bottom end and a top end, the bottom end attached to said upper portion of said interior chamber, and the top end attached to a side of said central opening of said top end of said unitary body such that it seals said body of viscous fluid contained in said interior chamber; (i) whereby loading on said load receiving adaptor creates deflection on said pair of off-center load cells, thereby producing said voltage output proportional to the weight of said object, and when a mechanical shock is discharged on said load receiving adaptor, the vibration will be transferred to said damping piston means and cause said substantially flat lower surface of said damping piston means to move toward said flat bottom of said interior chamber, so that said body of viscous fluid between said substantially flat lower surface of said damping piston means and said flat bottom of said interior chamber is compressed into said narrow passage of said damping piston means and creates a resistance force on said damping piston means that effectively dampens the vibration.

Defined alternatively broadly, the present invention is a load cell device for determining the weight of an object, comprising: (a) at least two load cells integrally connected to each other and forming a unitary body, the unitary body having a first end with an opening and an interior chamber defined by a flat bottom and a sidewall with an upper portion and located between the at least two off-center load cells; (b) a load receiving means for covering said opening of said first end of said unitary body; (c) at least two equally spaced apart strain gages respectively attached to said unitary body and lying on a horizontal plane for producing a voltage output proportional to the weight of said object; (d) a piston means having a flat lower surface, a side surface, an upper surface, and a narrow passage extending through the piston means from the upper surface to the flat lower surface, the circumferential dimension of said piston means being slightly less than the circumferential dimension of said interior chamber; (e) means for attaching said piston means to said load receiving means and suspending said piston means in said interior chamber, such that said side surface of said piston means is very close to said sidewall of said interior chamber, but said flat lower surface of said piston means is positioned parallel and remote from said flat bottom of said interior chamber, which leaves a large space between said flat lower surface of said piston means and said flat bottom of said interior chamber; (f) a body of viscous fluid of sufficient quantity contained in said interior chamber such that at least said flat lower surface of said piston means is submerged such that the body of viscous fluid can flow through said narrow passage of said piston means; and (g) means for sealing said body of viscous fluid contained in said interior chamber; (h) whereby loading on said load receiving means creates deflection on said at least two load cells, thereby producing said voltage output proportional to the weight of said object, and when a mechanical shock is discharged on said load receiving means, the vibration will be transferred to said piston means and cause said flat lower surface of said piston means to move toward said flat bottom of said interior chamber, so that said body of viscous fluid between said flat lower surface of said piston means and said flat bottom of said interior chamber is compressed into said narrow passage of said piston means and creates a resistance force on said piston means that effectively dampens the vibration.

Defined also alternatively in detail, the present invention is a load cell for determining the weight of an object, comprising: (a) a generally hollow cylindrical shaped body having a bottom end, a circumferential sidewall and a top end with an opening; (b) a vertical cylindrical shaped loading column located centrally within said cylindrical shaped body and having a lower section with a lower end, an upper section with an upper end, and an interior chamber defined by a flat bottom and a circumferential sidewall with an upper portion and located within the vertical cylindrical shaped loading column; (c) at least two equally spaced apart thin flexible horizontal bottom beams integrally connected to said lower section of said vertical cylindrical loading column and extending radially and integrally connected to said circumferential sidewall of said cylindrical shaped body; (d) at least two equally spaced apart thin flexible horizontal top beams all being angularly offset from said at least two equally spaced apart thin flexible horizontal bottom beams and integrally connected to said upper section of said vertical cylindrical loading column and extending radially and integrally connected to said circumferential sidewall of said cylindrical shaped body; (e) at least two equally spaced apart strain gages respectively attached a respective one of said at least two equally spaced apart horizontal beams and lying generally on a horizontal plane for producing a voltage output proportional to the weight of said object; (f) a disk shaped cover member covering said opening at said top end of said cylindrical shaped body and having a central opening; (g) a load accepting member mounted on said disk shaped cover member and having a protruding bottom end extending through and covering said central opening of said disk shaped cover member; (h) a damping piston means having a circumferential side surface and a substantially flat lower surface; (i) the circumferential wall of said damping piston means being smaller than the circumferential wall of said interior chamber; (j) means for attaching said damping piston means to said protruding bottom end of said load accepting member and suspending said damping piston means in said interior chamber, such that said circumferential side surface of said damping piston means clears said circumferential sidewall of said interior chamber, but said substantially flat lower surface of said damping piston means is positioned parallel and very close to said flat bottom of said interior chamber, which leaves a very narrow space between said substantially flat lower surface of said damping piston means and said flat bottom of said interior chamber; (k) a body of viscous fluid of sufficient quantity contained in said interior chamber such that at least said substantially flat lower surface of said damping piston means is submerged; and (l) a bellows seal means mounted between said interior chamber and said load accepting member and having a bottom end and a top end, the bottom end attached to said upper portion of said interior chamber, and the top end attached to a side of said protruding bottom end of said load accepting member such that it seals said body of viscous fluid contained in said interior chamber; (m) whereby loading on said vertical cylindrical loading column creates deflection on said at least two horizontal top beams and similar deflection on said at least two horizontal bottom beams, thereby producing said voltage output proportional to the weight of said object, and when a mechanical shock is discharged on said vertical cylindrical loading column, the vibration will be transferred to said damping piston means and cause said substantially flat lower surface of said damping piston means to move toward said flat bottom of said interior chamber, so that said body of viscous fluid between said substantially flat lower surface of said damping piston means and said flat bottom of said interior chamber is compressed and creates a resistance force on said damping piston means that effectively dampens the vibration.

Defined also alternatively broadly, the present invention is a load cell for determining the weight of an object, comprising: (a) a body having a bottom end, a sidewall and a top end with an opening; (b) a loading column located centrally within said body and having a lower section with a lower end, an upper section with an upper end, and an interior chamber defined by a flat bottom and a sidewall with an upper portion and located within the loading column; (c) at least two bottom beams integrally connected to said lower section of said loading column and extending radially and integrally connected to said sidewall of said body; (d) at least two top beams all being angularly offset from said at least two bottom beams and integrally connected to said upper section of said loading column and extending radially and integrally connected to said sidewall of said body; (e) means for producing a voltage output proportional to the weight of said object; (f) a cover member covering said opening at said top end of said body and having a central opening; (g) a load accepting means mounted on said cover member and having a bottom end extending through and covering said opening of said cover member; (h) a piston means having a side surface and a flat lower surface, the circumferential wall of said piston means being smaller than the circumferential wall of said interior chamber; (i) means for attaching said piston means to said bottom end of said load accepting means and suspending said piston means in said interior chamber, such that said side surface of said piston means clears said sidewall of said interior chamber, but said flat lower surface of said piston means is positioned parallel and very close to said flat bottom of said interior chamber, which leaves a very narrow space between said flat lower surface of said piston means and said flat bottom of said interior chamber; (j) a body of viscous fluid of sufficient quantity contained in said interior chamber such that at least said flat lower surface of said piston means is submerged; and (k) means for sealing said interior chamber such that said body of viscous fluid is contained in said interior chamber; (l) whereby loading on said loading column creates deflection on said at least two top beams and similar deflection on said at least two bottom beams, thereby producing said voltage output proportional to the weight of said object, and when a mechanical shock is discharged on said loading column, the vibration will be transferred to said piston means and cause said flat lower surface of said piston means to move toward said flat bottom of said interior chamber, so that said body of viscous fluid between said flat lower surface of said piston means and said flat bottom of said interior chamber is compressed and creates a resistance force on said piston means that effectively dampens the vibration.

Defined again alternatively in detail, the present invention is a load cell for determining the weight of an object, comprising: (a) a generally hollow cylindrical shaped body having a bottom end, a circumferential sidewall and a top end with an opening; (b) a vertical cylindrical shaped loading column located centrally within said cylindrical shaped body and having a lower section with a lower end, an upper section with an upper end, and an interior chamber defined by a flat bottom and a circumferential sidewall with an upper portion and located within the vertical cylindrical shaped loading column; (c) at least two equally spaced apart thin flexible horizontal bottom beams integrally connected to said lower section of said vertical cylindrical loading column and extending radially and integrally connected to said circumferential sidewall of said cylindrical shaped body; (d) at least two equally spaced apart thin flexible horizontal top beams all being angularly offset from said at least two equally spaced apart thin flexible horizontal bottom beams and integrally connected to said upper section of said vertical cylindrical loading column and extending radially and integrally connected to said circumferential sidewall of said cylindrical shaped body; (e) at least two equally spaced apart strain gages respectively attached to a respective one of said at least two equally spaced apart horizontal beams and lying generally on a horizontal plane for producing a voltage output proportional to the weight of said object; (f) a disk shaped cover member covering said opening at said top end of said cylindrical shaped body and having a central opening; (g) a load accepting member mounted on said disk shaped cover member and having a protruding bottom end extending through and covering said central opening of said disk shaped cover member; (h) a damping piston means having a substantially flat lower surface, a circumferential side surface, an upper surface, and a vertical interior narrow passage extending through the damping piston means from the upper surface to the flat lower surface; (i) the circumferential wall of said damping piston means being slightly less than the circumferential wall of said interior chamber; (j) means for attaching said damping piston means to said load accepting member and suspending said damping piston means in said interior chamber, such that said circumferential side surface of said damping piston means is very close to said circumferential sidewall of said interior chamber, but said flat lower surface of said damping piston means is positioned parallel and remote from said flat bottom of said interior chamber, which leaves a large space between said flat lower surface of said damping piston means and said flat bottom of said interior chamber; (k) a body of viscous fluid of sufficient quantity ontained in said interior chamber such that at least said flat lower surface of said damping piston means is submerged such that the body of viscous fluid can flow through said narrow passage of said damping piston means; and (l) a bellows seal means mounted between said interior chamber and said load accepting member and having a bottom end and a top end, the bottom end attached to said upper portion of said interior chamber, and the top end attached to a side of said protruding bottom end of said load accepting member such that it seals said body of viscous fluid contained in said interior chamber; (m) whereby loading on said vertical cylindrical loading column creates deflection on said at least two horizontal top beams and similar deflection on said at least two horizontal bottom beams, thereby producing said voltage output proportional to the weight of said object, and when a mechanical shock is discharged on said vertical cylindrical loading column, the vibration will be transferred to said damping piston means and cause said substantially flat lower surface of said damping piston means to move toward said flat bottom of said interior chamber, so that said body of viscous fluid between said substantially flat lower surface of said damping piston means and said flat bottom of said interior chamber is compressed into said narrow passage of said damping piston means and creates a resistance force on said damping piston means that effectively dampens the vibration.

Defined again alternatively broadly, the present invention is a load cell for determining the weight of an object, comprising: (a) a body having a bottom end, a sidewall and a top end with an opening; (b) a loading column located centrally within said body and having a lower section, an upper section, and a chamber defined by a bottom and a sidewall with an upper portion and located within the loading column; (c) at least two bottom beams integrally connected to said lower section of said loading column and extending radially and integrally connected to said sidewall of said body; (d) at least two top beams all being angularly offset from said at least two bottom beams and integrally connected to said upper section of said loading column and extending radially and integrally connected to said sidewall of said body; (e) means for producing a voltage output proportional to the weight of said object; (f) a cover member for covering said opening at said top end of said body and having an opening; (g) a load accepting means mounted on said cover member and having a bottom end extending through and covering said opening of said cover member;

(h) a piston means having a lower surface, a side surface, an upper surface, and a narrow passage extending through from the upper surface to the lower surface, the circumferential wall of said piston means being slightly less than the circumferential wall of said interior chamber; (i) means for attaching said piston means to said load accepting means and suspending said piston means in said chamber, such that said side surface of said piston means is very close to said sidewall of said interior chamber, but said lower surface of said piston means is positioned parallel and remote from said bottom of said chamber, which leaves a large space between said lower surface of said piston means and said bottom of said interior chamber; (j) a body of viscous fluid of sufficient quantity contained in said chamber such that at least said lower surface of said piston means is submerged so that the body of viscous fluid can flow through said narrow passage of said piston means; and (k) means for sealing said body of viscous fluid contained in said chamber; (l) whereby loading on said loading column creates deflection on said at least two top beams and similar deflection on said at least two bottom beams, thereby producing said voltage output proportional to the weight of said object, and when a mechanical shock is discharged on said loading column, the vibration will be transferred to said piston means and cause said lower surface of said piston means to move toward said bottom of said chamber, so that said body of viscous fluid between said lower surface of said piston means and said bottom of said chamber is compressed into said narrow passage of said piston means and creates a resistance force on said piston means that effectively dampens the vibration.

Defined further alternatively in detail, the present invention is a load cell for determining the weight of an object, comprising: (a) at least one off-center load cell having a fixed section and an opposite section which when loaded deflects slightly relative to the fixed section, the fixed section having a cylindrical chamber remote from the opposite section, the cylindrical chamber defined by a flat bottom and a circumferential sidewall with an upper portion; (b) an upper horizontal beam having one end attached to said opposite section and the other end extending across and aligned with said cylindrical chamber of said fixed section; (c) means for producing a voltage output proportional to the weight of the load; (d) a damping piston means having a circumferential side surface and a substantially flat lower surface, the circumferential wall of the damping piston means being smaller than the circumferential wall of said interior chamber; (e) means for attaching said damping piston means to said other end of said upper horizontal beam and suspending said damping piston means in said interior chamber, such that said circumferential side surface of said damping piston means clears from said circumferential sidewall of said interior chamber, but said substantially flat lower surface of said damping piston means is positioned parallel and very close to said bottom of said interior chamber, which leaves a very narrow space between said substantially flat lower surface of said damping piston means and said flat bottom of said interior chamber; (f) a body of viscous fluid of sufficient quantity contained in said interior chamber such that at least said substantially flat lower surface of said damping piston means is submerged; and (g) means for sealing said body of viscous fluid contained in said chamber; (h) whereby loading on said other end of said horizontal beam creates deflection on said at least one off-center load cell, thereby producing said voltage output proportional to the weight of said object, and when a mechanical shock is discharged on said other end of said horizontal beam, the vibration will be transferred to said damping piston means and cause said substantially flat lower surface of said damping piston means to move toward said flat bottom of said interior chamber, so that said body of viscous fluid between said substantially flat lower surface of said damping piston means and said flat bottom of said interior chamber is compressed and creates a resistance force on said damping piston means that effectively dampens the vibration.

Defined further alternatively broadly, the present invention is a load cell, comprising: (a) at least one off-center load cell having a fixed portion and an opposite portion which when loaded deflects slightly relative to the fixed portion; (b) said fixed portion having a chamber defined by a bottom and a sidewall; (c) a piston means having a lower surface and a side surface and disposed within said cylindrical chamber and securely connected such that said piston means moves within said chamber, where the piston and said cylindrical chamber all lie on the same concentric line; (d) a body of viscous fluid of sufficient quantity contained in said chamber and covering at least said lower surface of said piston means such that said side surface of said piston means clears said sidewall of said chamber, but said lower surface of said piston means is positioned parallel and very close to said bottom of said chamber, which leaves a very narrow space between said lower surface of said piston means and said bottom of said chamber and viscous damping is created; (e) means for producing a voltage output proportional to the weight of the load; and (f) means for sealing said body of viscous fluid contained in said chamber.

Defined also further alternatively in detail, the present invention is a load cell for determining the weight of an object, comprising: (a) at least one off-center load cell having a fixed section and an opposite section which when loaded deflects slightly relative to the fixed section, the fixed section having a cylindrical chamber remote from the opposite section, the cylindrical chamber defined by a flat bottom and a circumferential sidewall with an upper portion; (b) an upper horizontal beam having one end attached to said opposite section and the other end extending across and aligned with said cylindrical chamber of said fixed section; (c) means for producing a voltage output proportional to the weight of the load; (d) a damping piston means having a substantially flat lower surface, a circumferential side surface and an upper surface, and a narrow passage through the damping piston means from the upper surface to the flat lower surface, the circumferential wall of the damping piston means being slightly less than the circumferential wall of said interior chamber; (e) means for attaching said damping piston means to said other end of said upper horizontal beam and suspending said damping piston means in said interior chamber, such that said circumferential side surface of said damping piston means is very close to said circumferential sidewall of said interior chamber, but said substantially flat lower surface of said damping piston means is positioned parallel and remote from said bottom of said interior chamber, which leaves a large space between said substantially flat lower surface of said damping piston means and said flat bottom of said interior chamber; (f) a body of viscous fluid of sufficient quantity contained in said interior chamber such that at least said substantially flat lower surface of said damping piston means is submerged such that the body of viscous fluid can flow through said narrow passage of said damping piston means; and (g) means for sealing said body of viscous fluid contained in said chamber; (h) whereby loading on said other end of said horizontal beam creates deflection on said at least one off-center load cell, thereby producing said voltage output proportional to the weight of said object, and when a mechanical shock is discharged on said other end of said horizontal beam, the vibration will be transferred to said damping piston means and cause said substantially flat lower surface of said damping piston means to move toward said flat bottom of said interior chamber, so that said body of viscous fluid between said substantially flat lower surface of said damping piston means and said flat bottom said interior chamber is compressed into said narrow passage of said damping piston means and creates a resistance force on said damping piston means that effectively dampens the vibration.

Defined also further alternatively broadly, the present invention is a load cell, comprising: (a) at least one off-center load cell having a fixed portion and an opposite portion which when loaded deflects slightly relative to the fixed portion; (b) said fixed portion having a chamber defined by a bottom and a sidewall; (c) a piston means having a lower surface, a side surface, an upper surface, and a narrow passage extending through the piston means from the upper surface to said lower surface, the piston means disposed within said chamber and securely connected such that said piston means moves within said chamber, where the piston and said chamber all lie on the same concentric line; (d) a body of viscous of sufficient quantity fluid contained in said chamber and covering at least said lower surface of said piston means such that said side surface of said piston means is very close to said sidewall of said chamber, but said lower surface of said piston means is positioned parallel and remote from said bottom of said chamber, which leaves a large space between said lower surface of said piston means and said bottom of said chamber and viscous damping is created; (e) means for producing a voltage output proportional to the weight of the load; and (f) means for sealing said body of viscous fluid contained in said chamber.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A weighing device, comprised of at least one off-center load cell having a fixed part which is mounted on a base, a deflectable part which when loaded deflects slightly relative to said fixed part, and stress surfaces connecting the fixed part to the deflectable part, said deflectable part having an extension part securely connected and extending generally in a direction of said fixed part, said extension part opposes said fixed part but does not touch said fixed part or any other part of said weighing device except where said deflectable part is connected, and in which arrangement when load is applied on said deflectable part there will result a slight relative motion between said extension part and said fixed part opposing said deflectable part, strain gages bonded on said stressed surfaces such that when loaded, a voltage output signal is produced which is proportional to the weight of the load, and into said fixed part a cylindrical space is built, while in the opposing extension part, a piston is securely connected through a connecting rod, which the connecting rod causes said piston to move into said cylindrical space such that said piston, said connecting rod and said cylindrical space all lie on the same concentric line, said cylindrical space filled with viscous fluid covering at least said piston and said piston having a very small gap between its own lower surface and the bottom of said cylindrical space, such that when a force is applied to said load cell then said piston is caused to move within said cylindrical space toward said bottom of said cylindrical space and viscous damping is created.

2. The weighing device in accordance with claim 1 wherein said piston is configured such that there is a very small radial gap between said piston and a sidewall of said cylindrical space, and a narrow internal passage extending through the piston from its bottom to its top such that fluid flow from the bottom of said piston to the top of said piston is effected and said flow creates the viscous damping.

3. The weighing device in accordance with claim 1 wherein said extension part is integrally made as one piece with said fixed part and said deflectable part of said load cell device.

4. A load cell device for determining the weight of a load, comprising:

a. a pair of opposing off-center load cells integrally connected to each other and forming a unitary body, the unitary body having a top end with a central opening, a central cylindrical interior chamber located between the pair of opposing off-center load cells, and a protruding bottom end, the cylindrical interior chamber defined by a flat bottom and a circumferential sidewall with an upper portion;

b. a load receiving adaptor mounted on said top end of said unitary body by connecting means and creates deflection on said pair of off-center load cells, the load receiving adaptor having a protruding bottom end extending through and covering said central opening of said top end of said unitary body;

c. at least two equally spaced apart strain gages respectively attached to a respective one of said pair of opposing off-center load cells, and lying generally on a horizontal plane for producing a voltage output proportional to the weight of said load;

d. a damping piston means having a circumferential side surface and a substantially flat lower surface;

e. the circumferential wall of said damping piston means being smaller than the circumferential wall of said interior chamber;

f. means for attaching said damping piston means to said protruding bottom end of said load receiving adaptor and suspending said damping piston means in said interior chamber, such that said circumferential side surface of said damping piston means clears said circumferential sidewall of said interior chamber, but said substantially flat lower surface of said damping piston means is positioned parallel and very close to said flat bottom wall of said interior chamber, which leaves a very narrow space between said substantially flat lower surface of said damping piston means and said flat bottom of said interior chamber;

g. a body of viscous fluid of sufficient quantity contained in said interior chamber such that at least said substantially flat lower surface of said damping piston means is submerged, so that the body of viscous fluid between said substantially flat lower surface of said damping piston means and said flat bottom of said interior chamber is compressed and creates a resistance force on said damping piston means that effectively dampens vibration on said load; and h. a bellows seal means mounted between said interior chamber and said load receiving adaptor and having a bottom end and a top end, the bottom end attached to said upper portion of said interior chamber, and the top end attached to a side of said central opening of said top end of said unitary body such that it seals said body of viscous fluid contained in said interior chamber.

5. The load cell device in accordance with claim 4 wherein said damping piston means is generally disc shaped.

6. The load cell device in accordance with claim 4 wherein said means for attaching said damping piston means to said bottom end of said load receiving adaptor and suspending said damping piston means includes a connecting rod.

7. The load cell device in accordance with claim 4 wherein said pair of off-center load cells are of a 2-beam off-center configuration.

8. A load cell device for determining the weight of a load, comprising:

a. at least two load cells integrally connected to each other and forming a unitary body, the unitary body having a first end with an opening, and an interior chamber defined by a flat bottom and a sidewall with an upper portion and located between the at least two off-center load cells;

b. a load receiving means for covering said opening of said first end of said unitary body and creates deflection on said at least two load cells;

c. at least two equally spaced apart strain gages respectively attached to said unitary body and lying on a horizontal plane for producing a voltage output proportional to the weight of said load;

d. a piston means having a side surface and a flat lower surface, the circumferential dimension of the piston means being smaller than the circumferential dimension of said interior chamber;

e. means for attaching said piston means to said load receiving means and suspending said piston means in said interior chamber, such that said side surface of said piston means clears said sidewall of said interior chamber, but said flat lower surface of said piston means is positioned parallel and very close to said flat bottom of said interior chamber, which leaves a very narrow space between said flat lower surface of said piston means and said flat bottom of said interior chamber;

f. a body of viscous fluid of sufficient quantity contained in said interior chamber such that at least said flat lower surface of said piston means is submerged, so that the body of viscous fluid between said flat lower surface of said piston means and said flat bottom of said interior chamber is compressed and creates a resistance force on said piston means that effectively dampens vibration on said load; and g. means for sealing said body of viscous fluid contained in said interior chamber.

9. The load cell device in accordance with claim 8 wherein said piston means is generally disc shaped.

10. The load cell device in accordance with claim 8 wherein said means for attaching said piston means to said load receiving means and suspending said piston means includes a connecting rod.

11. The load cell device in accordance with claim 8 wherein said at least two load cells are of a 2-beam off-center configuration.

12. The load cell device in accordance with claim 8 wherein said means for sealing said body of viscous fluid contained in said interior chamber includes a bellows shaped seal.

13. The load cell device in accordance with claim 8 wherein said unitary body is generally a rectangular in shape.

14. A load cell device for determining the weight of a load, comprising:

a. a pair of opposing off-center load cells integrally connected to each other and forming a unitary body, the unitary body having a top end with a central opening, a central cylindrical interior chamber located between the pair of opposing off-center load cells, and a protruding bottom end, the cylindrical interior chamber defined by a flat bottom and a circumferential sidewall with an upper portion;

b. a load receiving adaptor mounted on said top end of said unitary body by connecting means and creates deflection on said pair of off-center load cells, the load receiving adaptor having a protruding bottom end extending through and covering said central opening of said top end of said unitary body;

c. at least two equally spaced apart strain gages respectively attached to a respective one of said pair of off-center load cells, and lying generally on a horizontal plane for producing a voltage output proportional to the weight of said object;

d. a damping piston means having a circumferential side surface, a substantially flat lower surface, an upper surface and a vertical interior narrow passage extending through the damping piston means from the upper surface to the flat lower surface;

e. the circumferential wall of said damping piston means being slightly less than the circumferential wall of said interior chamber;

f. means for attaching said damping piston means to said protruding bottom end of said load receiving adaptor and suspending said damping piston means in said interior chamber, such that said circumferential side surface of said damping piston means is very close to said circumferential sidewall of said interior chamber, but said substantially flat lower surface of said damping piston means is positioned parallel and remote from said flat bottom of said interior chamber, which leaves a large space between said substantially flat lower surface of said damping piston means and said flat bottom of said interior chamber;

g. a body of viscous fluid of sufficient quantity contained in said interior chamber such that at least said substantially flat lower surface of said damping piston means is submerged such that the body of viscous fluid can flow through said narrow passage of said damping piston means and creates a resistance force on said damping piston means that effectively dampens vibration on said load; and h. a bellows seal means mounted between said interior chamber and said load receiving adaptor and having a bottom end and a top end, the bottom end attached to said upper portion of said interior chamber, and the top end attached to a side of said central opening of said top end of said unitary body such that it seals said body of viscous fluid contained in said interior chamber.

15. The load cell device in accordance with claim 14 wherein said damping piston means is generally disc shaped.

16. The load cell device in accordance with claim 14 wherein said means for attaching said damping piston means to said bottom end of said load receiving adaptor and suspending said damping piston means includes a connecting rod.

17. The load cell device in accordance with claim 14 wherein said pair of off-center load cells are of a 2-beam off-center configuration.

18. A load cell device for determining the weight of a load, comprising:
   a. at least two load cells integrally connected to each other and forming a unitary body, the unitary body having a first end with an opening and an interior chamber defined by a flat bottom and a sidewall with an upper portion and located between the at least two off-center load cells;
   b. a load receiving means for covering said opening of said first end of said unitary body and creates deflection on said at least two load cells;
   c. at least two equally spaced apart strain gages respectively attached to said unitary body and lying on a horizontal plane for producing a voltage output proportional to the weight of said object;
   d. a piston means having a flat lower surface, a side surface, an upper surface, and a narrow passage extending through the piston means from the upper surface to the flat lower surface, the circumferential dimension of said piston means being slightly less than the circumferential dimension of said interior chamber;
   e. means for attaching said piston means to said load receiving means and suspending said piston means in said interior chamber, such that said side surface of said piston means is very close to said sidewall of said interior chamber, but said flat lower surface of said piston means is positioned parallel and remote from said flat bottom of said interior chamber, which leaves a large space between said flat lower surface of said piston means and said flat bottom of said interior chamber;
   f. a body of viscous fluid of sufficient quantity contained in said interior chamber such that at least said flat lower surface of said piston means is submerged such that the body of viscous fluid can flow through said narrow passage of said piston means and creates a resistance force on said piston means that effectively dampens vibration on said load; and
   g. means for sealing said body of viscous fluid contained in said interior chamber.

19. The load cell device in accordance with claim 18 wherein said piston means is generally disc shaped.

20. The load cell device in accordance with claim 18 wherein said means for attaching said piston means to said load receiving means and suspending said piston means includes a connecting rod.

21. The load cell device in accordance with claim 18 wherein said at least two off-center load cells are of a 2-beam off-center configuration.

22. The load cell device in accordance with claim 18 wherein said means for sealing said body of viscous fluid contained in said interior chamber includes a bellows shaped seal.

23. The load cell device in accordance with claim 18 wherein said unitary body is generally a rectangular in shape.

24. A load cell for determining the weight of a load, comprising:
   a. a generally hollow cylindrical shaped body having a bottom end, a circumferential sidewall and a top end with an opening;
   b. a vertical cylindrical shaped loading column located centrally within said cylindrical shaped body and having a lower section with a lower end, an upper section with an upper end, and an interior chamber defined by a flat bottom and a circumferential sidewall with an upper portion and located within the vertical cylindrical shaped loading column;
   c. at least two equally spaced apart thin flexible horizontal bottom beams integrally connected to said lower section of said vertical cylindrical loading column and extending radially and integrally connected to said circumferential sidewall of said cylindrical shaped body;
   d. at least two equally spaced apart thin flexible horizontal top beams all being angularly offset from said at least two equally spaced apart thin flexible horizontal bottom beams and integrally connected to said upper section of said vertical cylindrical loading column and extending radially and integrally connected to said circumferential sidewall of said cylindrical shaped body, where said vertical cylindrical loading column creates deflection on said at least two horizontal top beams and similar deflection on said at least two horizontal bottom beams;
   e. at least two equally spaced apart strain gages respectively attached a respective one of said at least two equally spaced apart horizontal beams and lying generally on a horizontal plane for producing a voltage output proportional to the weight of said load;
   f. a disk shaped cover member covering said opening at said top end of said cylindrical shaped body and having a central opening;
   g. a load accepting member mounted on said disk shaped cover member and having a protruding bottom end extending through and covering said central opening of said disk shaped cover member;
   h. a damping piston means having a circumferential side surface and a substantially flat lower surface;
   i. the circumferential wall of said damping piston means being smaller than the circumferential wall of said interior chamber;
   j. means for attaching said damping piston means to said protruding bottom end of said load accepting member and suspending said damping piston means in said interior chamber, such that said circumferential side surface of said damping piston means clears said circumferential sidewall of said interior chamber, but said substantially flat lower surface of said damping piston means is positioned parallel and very close to said flat bottom of said interior chamber, which leaves a very narrow space between said substantially flat lower surface of said damping piston means and said flat bottom of said interior chamber;
   k. a body of viscous fluid of sufficient quantity contained in said interior chamber such that at least said substantially flat lower surface of said damping piston means is submerged, so that the body of viscous fluid between said substantially flat lower surface of said damping piston means and said flat bottom of said interior chamber is compressed and creates a resistance force on said damping piston means that effectively dampens vibration on said load; and l. a bellows seal means mounted between said interior chamber and said load accepting member and having a bottom end and a top end, the bottom end attached to said upper portion of said interior chamber, and the top end attached to a side of said protruding bottom end of said load accepting member such that it seals said body of viscous fluid contained in said interior chamber.

25. The load cell in accordance with claim 24 wherein said damping piston means is generally disc shaped.

26. The load cell in accordance with claim 24 wherein said means for attaching said damping piston means to said bottom end of said load accepting member and suspending said damping piston means includes a connecting rod.

27. A load cell for determining the weight of a load, comprising:
   a. a body having a bottom end, a sidewall and a top end with an opening;
   b. a loading column located centrally within said body and having a lower section with a lower end, an upper section with an upper end, and an interior chamber defined by a flat bottom and a sidewall with an upper portion and located within the loading column;
   c. at least two bottom beams integrally connected to said lower section of said loading column and extending radially and integrally connected to said sidewall of said body;
   d. at least two top beams all being angularly offset from said at least two bottom beams and integrally connected to said upper section of said loading column and extending radially and integrally connected to said sidewall of said body, where said loading column creates deflection on said at least two top and bottom beams;
   e. means for producing a voltage output proportional to the weight of said object;
   f. a cover member covering said opening at said top end of said body and having a central opening;
   g. a load accepting means mounted on said cover member and having a bottom end extending through and covering said opening of said cover member;
   h. a piston means having a side surface and a flat lower surface, the circumferential wall of said piston means being smaller than the circumferential wall of said interior chamber;
   i. means for attaching said piston means to said bottom end of said load accepting means and suspending said piston means in said interior chamber, such that said side surface of said piston means clears said sidewall of said interior chamber, but said flat lower surface of said piston means is positioned parallel and very close to said flat bottom of said interior chamber, which leaves a very narrow space between said flat lower surface of said piston means and said flat bottom of said interior chamber;
   j. a body of viscous fluid of sufficient quantity contained in said interior chamber such that at least said flat lower surface of said piston means is submerged, so that the body of viscous fluid between said flat lower surface of said piston means and said flat bottom of said interior chamber is compressed and creates a resistance force on said piston means that effectively dampens vibration on said load; and
   k. means for sealing said interior chamber such that said body of viscous fluid is contained in said interior chamber.

28. The load cell in accordance with claim 27 wherein said piston means is generally disc shaped.

29. The load cell in accordance with claim 27 wherein said means for attaching said piston means to said bottom end of said load accepting means and suspending said piston means includes a connecting rod.

30. The load cell in accordance with claim 27 wherein said body is generally a cylindrical shape.

31. The load cell in accordance with claim 27 wherein said loading column is generally a cylindrical shape.

32. The load cell in accordance with claim 27 wherein said loading column is generally in a vertical direction.

33. The load cell in accordance with claim 27 wherein said at least two top and bottom beams are generally in a horizontal direction.

34. The load cell in accordance with claim 27 wherein said means for producing a voltage output proportional to the weight of said object includes at least two strain gages respectively attached to a respective one of said at least two beams.

35. A load cell for determining the weight of a load, comprising:
   a. a generally hollow cylindrical shaped body having a bottom end, a circumferential sidewall and a top end with an opening;
   b. a vertical cylindrical shaped loading column located centrally within said cylindrical shaped body and having a lower section with a lower end, an upper section with an upper end, and an interior chamber defined by a flat bottom and a circumferential sidewall with an upper portion and located within the vertical cylindrical shaped loading column;
   c. at least two equally spaced apart thin flexible horizontal bottom beams integrally connected to said lower section of said vertical cylindrical loading column and extending radially and integrally connected to said circumferential sidewall of said cylindrical shaped body;
   d. at least two equally spaced apart thin flexible horizontal top beams all being angularly offset from said at least two equally spaced apart thin flexible horizontal bottom beams and integrally connected to said upper section of said vertical cylindrical loading column and extending radially and integrally connected to said circumferential sidewall of said cylindrical shaped body, where said vertical cylindrical loading column creates deflection on the at least two horizontal top and bottom beams;
   e. at least two equally spaced apart strain gages respectively attached to a respective one of said at least two equally spaced apart horizontal beams and lying generally on a horizontal plane for producing a voltage output proportional to the weight of said object;
   f. a disk shaped cover member covering said opening at said top end of said cylindrical shaped body and having a central opening;
   g. a load accepting member mounted on said disk shaped cover member and having a protruding bottom end extending through and covering said central opening of said disk shaped cover member;
   h. a damping piston means having a substantially flat lower surface, a circumferential side surface, an upper surface, and a vertical interior narrow passage extending through the damping piston means from the upper surface to the flat lower surface;
   i. the circumferential wall of said damping piston means being slightly less than the circumferential wall of said interior chamber;

j. means for attaching said damping piston means to said load accepting member and suspending said damping piston means in said interior chamber, such that said circumferential side surface of said damping piston means is very close to said circumferential sidewall of said interior chamber, but said flat lower surface of said damping piston means is positioned parallel and remote from said flat bottom of said interior chamber, which leaves a large space between said flat lower surface of said damping piston means and said flat bottom of said interior chamber;

k. a body of viscous fluid of sufficient quantity contained in said interior chamber such that at least said flat lower surface of said damping piston means is submerged such that the body of viscous fluid can flow through said narrow passage of said damping piston means and creates a resistance force on said damping piston means that effectively dampens vibration on said load; and l. a bellows seal means mounted between said interior chamber and said load accepting member and having a bottom end and a top end, the bottom end attached to said upper portion of said interior chamber, and the top end attached to a side of said protruding bottom end of said load accepting member such that it seals said body of viscous fluid contained in said interior chamber.

36. The load cell in accordance with claim 35 wherein said damping piston means is generally disc shaped.

37. The load cell in accordance with claim 35 wherein said means for attaching said damping piston means to said bottom end of said load accepting member and suspending said damping piston means includes a connecting rod.

38. A load cell for determining the weight of a load, comprising:

a. a body having a bottom end, a sidewall and a top end with an opening;

b. a loading column located centrally within said body and having a lower section, an upper section, and a chamber defined by a bottom and a sidewall with an upper portion and located within the loading column;

c. at least two bottom beams integrally connected to said lower section of said loading column and extending radially and integrally connected to said sidewall of said body;

d. at least two top beams all being angularly offset from said at least two bottom beams and integrally connected to said upper section of said loading column and extending radially and integrally connected to said sidewall of said body, where said loading column creates deflection on the at least two top and bottom beams;

e. means for producing a voltage output proportional to the weight of said object;

f. a cover member for covering said opening at said top end of said body and having an opening;

g. a load accepting means mounted on said cover member and having a bottom end extending through and covering said opening of said cover member;

h. a piston means having a lower surface, a side surface, an upper surface, and a narrow passage extending through from the upper surface to the lower surface, the circumferential wall of said piston means being slightly less than the circumferential wall of said interior chamber;

i. means for attaching said piston means to said load accepting means and suspending said piston means in said chamber, such that said side surface of said piston means is very close to said sidewall of said interior chamber, but said lower surface of said piston means is positioned parallel and remote from said bottom of said chamber, which leaves a large space between said lower surface of said piston means and said bottom of said interior chamber;

j. a body of viscous fluid of sufficient quantity contained in said chamber such that at least said lower surface of said piston means is submerged so that the body of viscous fluid can flow through said narrow passage of said piston means and creates a resistance force on said piston means that effectively dampens vibration on said load; and k. means for sealing said body of viscous fluid contained in said chamber.

39. The load cell in accordance with claim 38 wherein said piston means is generally disc shaped.

40. The load cell in accordance with claim 38 wherein said means for attaching said piston means to said bottom end of said load accepting means and suspending said piston means includes a connecting rod.

41. The load cell in accordance with claim 38 wherein said body is generally a cylindrical shape.

42. The load cell in accordance with claim 38 wherein said loading column is generally a cylindrical shape.

43. The load cell in accordance with claim 38 wherein said loading column is generally in a vertical direction.

44. The load cell in accordance with claim 38 wherein said at least two top and bottom beams are generally in a horizontal direction.

45. The load cell in accordance with claim 38 wherein said means for producing a voltage output proportional to the weight of said object includes at least two strain gages respectively attached a respective one of said at least two beams.

46. A load cell for determining the weight of an object, comprising:

a. at least one off-center load cell having a fixed section, an opposite section, and at least two parallel beams connecting the fixed section to the opposite section, the opposite section when loaded deflects slightly relative to the fixed section, the fixed section having a cylindrical chamber remote from the opposite section, the cylindrical chamber defined by a flat bottom and a circumferential sidewall with an upper portion;

b. an upper horizontal beam having one end attached to said opposite section and the other end extending across and aligned with said cylindrical chamber of said fixed section, where the other end creates deflection on said at least one off-center load cell;

c. means for producing a voltage output proportional to the weight of the load;

d. a damping piston means having a circumferential side surface and a substantially flat lower surface, the circumferential wall of the damping piston means being smaller than the circumferential wall of said interior chamber;

e. means for attaching said damping piston means to said other end of said upper horizontal beam and suspending said damping piston means in said interior chamber, such that said circumferential side surface of said damping piston means clears from said circumferential sidewall of said interior chamber, but said substantially flat lower surface of said damping piston means is positioned parallel and very close to said bottom of said interior chamber, which leaves a very narrow space between said substantially flat lower surface of said damping piston means and said flat bottom of said interior chamber;

f. a body of viscous fluid of sufficient quantity contained in said interior chamber such that at least said substantially flat lower surface of said damping piston means is submerged, so that the body of viscous fluid between said substantially flat lower surface of said damping piston means and said flat bottom of said interior chamber is compressed and creates a resistance force on said damping piston means that effectively dampens vibration on said load; and g. means for sealing said body of viscous fluid contained in said chamber.

47. The load cell in accordance with claim 46 wherein said means for producing a voltage output proportional to the weight of said object includes at least two strain gages respectively attached to said at least one off-center load.

48. The load cell in accordance with claim 46 wherein said means for attaching said damping piston means to said other end of said upper horizontal beam and suspending said damping piston means includes a connecting rod.

49. The load cell in accordance with claim 46 wherein said means for sealing said body of viscous fluid contained in said interior chamber includes a bellows shaped seal.

50. A load cell for determining the weight of a load, comprising:

a. at least one off-center load cell having a fixed section, an opposite section, and at least one deflectable part connecting the fixed section to the opposite section, the opposite section when loaded deflects slightly relative to the fixed section, the fixed section having a cylindrical chamber remote from the opposite section, the cylindrical chamber defined by a flat bottom and a circumferential sidewall with an upper portion;

b. an upper horizontal beam having one end attached to said opposite section and the other end extending across and aligned with said cylindrical chamber of said fixed section, where the other end creates deflection on said at least one off-center load cell;

c. means for producing a voltage output proportional to the weight of the load;

d. a damping piston means having a substantially flat lower surface, a circumferential side surface and an upper surface, and a narrow passage through the damping piston means from the upper surface to the flat lower surface, the circumferential wall of the damping piston means being slightly less than the circumferential wall of said interior chamber;

e. means for attaching said damping piston means to said other end of said upper horizontal beam and suspending said damping piston means in said interior chamber, such that said circumferential side surface of said damping piston means is very close to said circumferential sidewall of said interior chamber, but said substantially flat lower surface of said damping piston means is positioned parallel and remote from said bottom of said interior chamber, which leaves a large space between said substantially flat lower surface of said damping piston means and said flat bottom of said interior chamber;

f. a body of viscous fluid of sufficient quantity contained in said interior chamber such that at least said substantially flat lower surface of said damping piston means is submerged such that the body of viscous fluid can flow through said narrow passage of said damping piston means and creates a resistance force on said damping piston means that effectively dampens vibration on said load; and g. means for sealing said body of viscous fluid contained in said chamber.

51. The load cell in accordance with claim 50 wherein said means for producing a voltage output proportional to the weight of said object includes at least two strain gages respectively attached to said at least one off-center load.

52. The load cell in accordance with claim 50 wherein said means for attaching said damping piston means to said other end of said upper horizontal beam and suspending said damping piston means includes a connecting rod.

53. The load cell in accordance with claim 50 wherein said means for sealing said body of viscous fluid contained in said interior chamber includes a bellows shaped seal.

* * * * *